June 9, 1936.   F. DAWES   2,043,607
APPARATUS FOR USE IN THE DRAWING, SPINNING, AND TWISTING OF YARNS
Filed Jan. 25, 1935   5 Sheets-Sheet 1

INVENTOR
Frank Dawes
By: Eugene E. Stevens
his atty.

June 9, 1936.  F. DAWES  2,043,607
APPARATUS FOR USE IN THE DRAWING, SPINNING, AND TWISTING OF YARNS
Filed Jan. 25, 1935  5 Sheets-Sheet 2
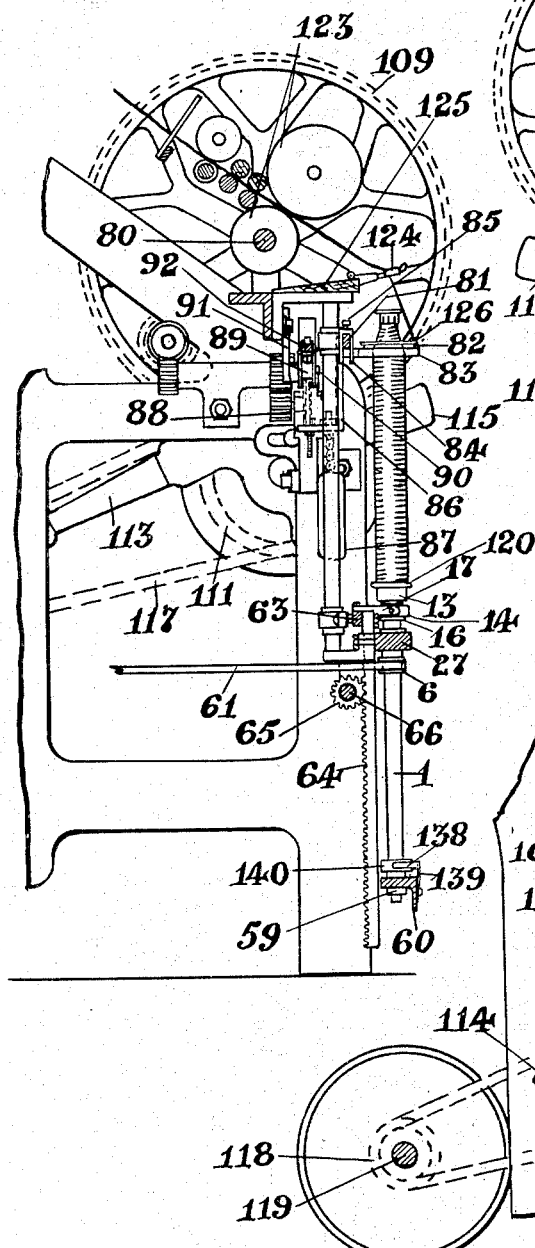
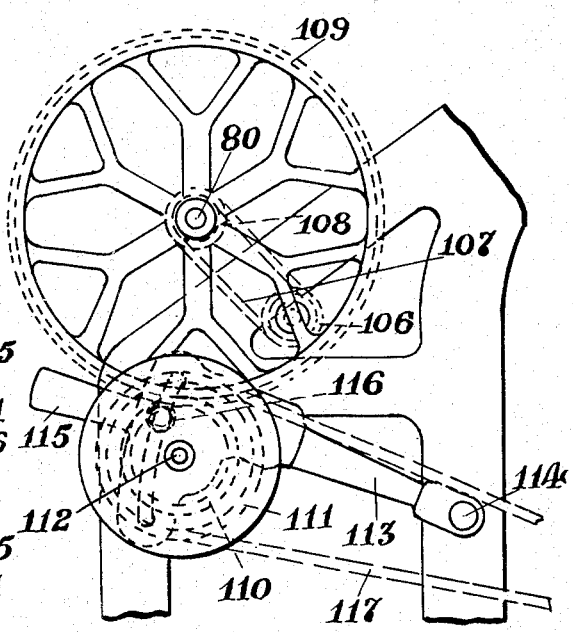
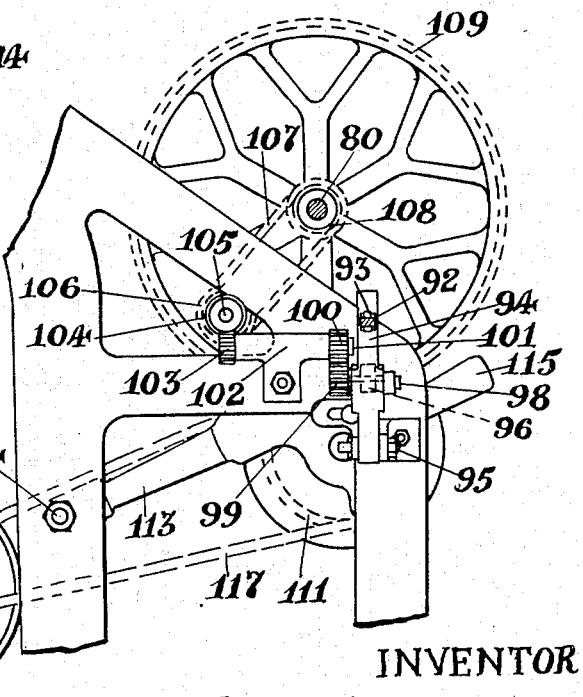
INVENTOR
Frank Dawes
By Eugene E. Stevens
Atty.

June 9, 1936.   F. DAWES   2,043,607
APPARATUS FOR USE IN THE DRAWING, SPINNING, AND TWISTING OF YARNS
Filed Jan. 25, 1935   5 Sheets-Sheet 3
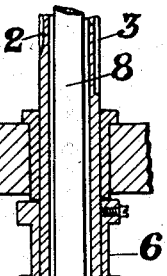
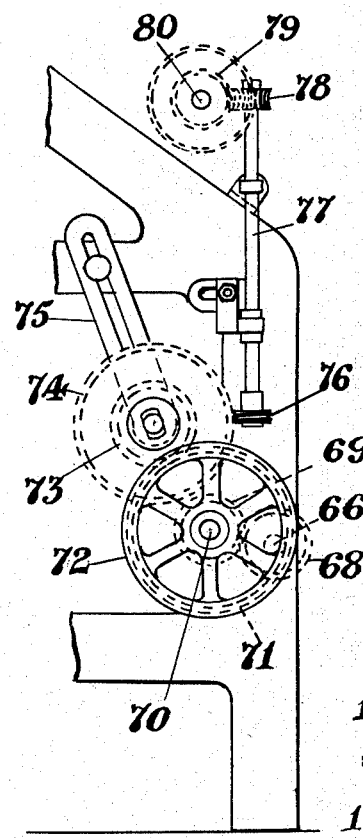
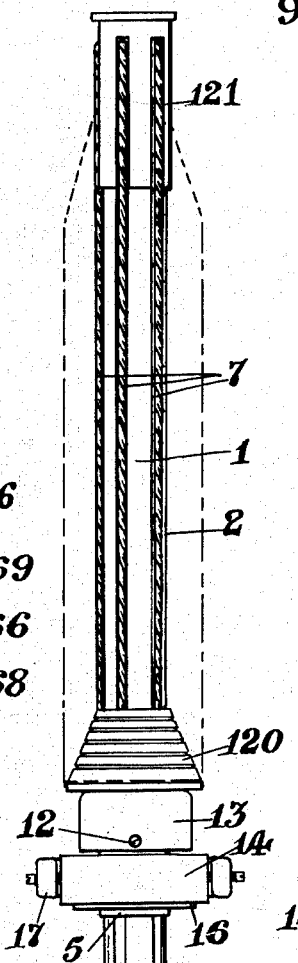
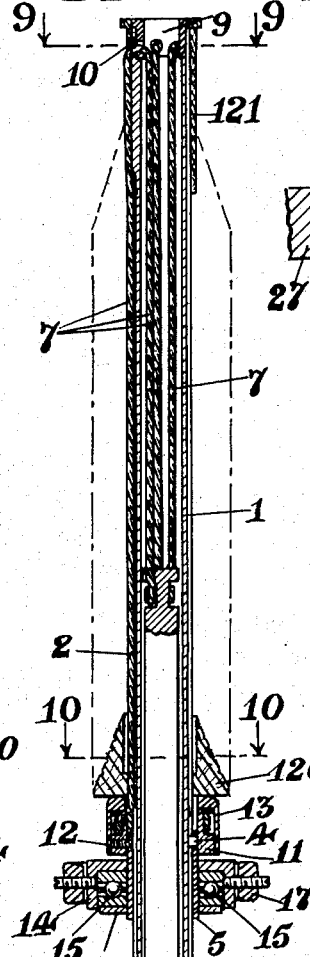
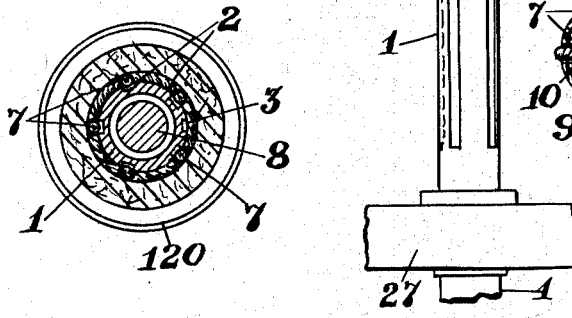
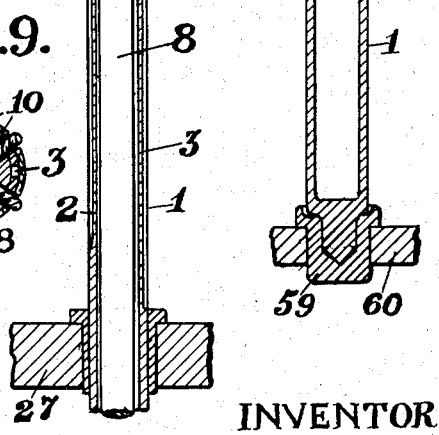
INVENTOR.
Frank Dawes
By: Eugene E. Stevens
Atty.

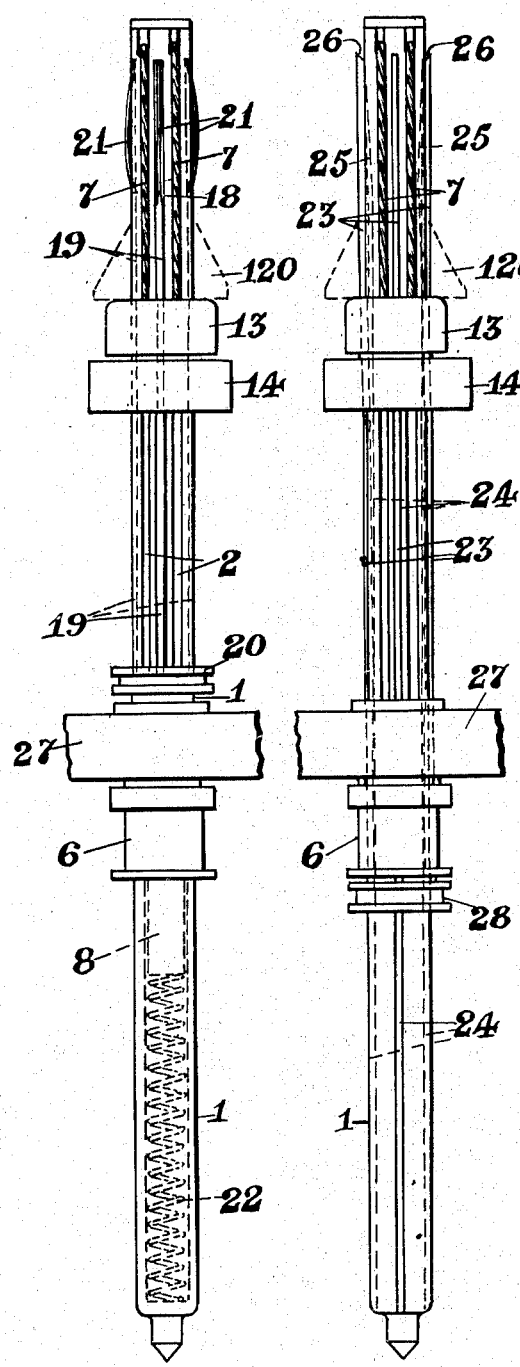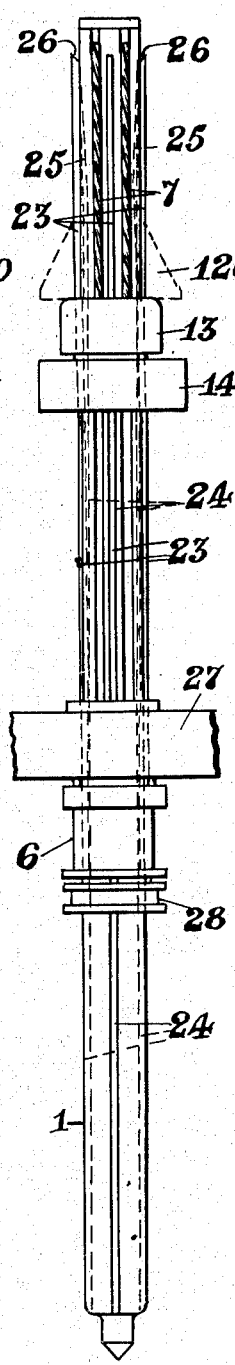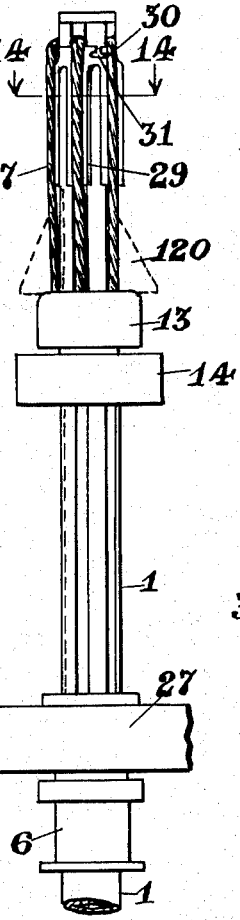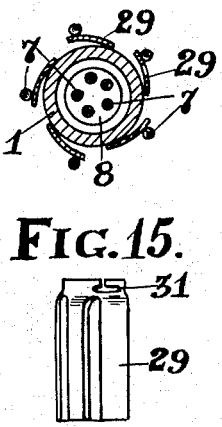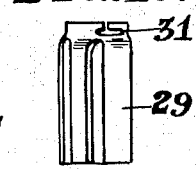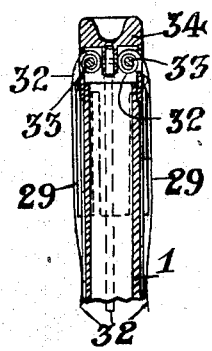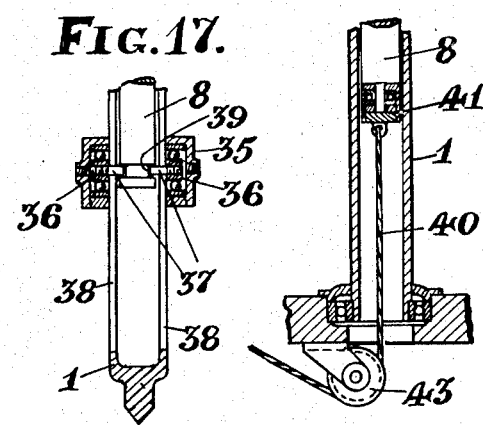

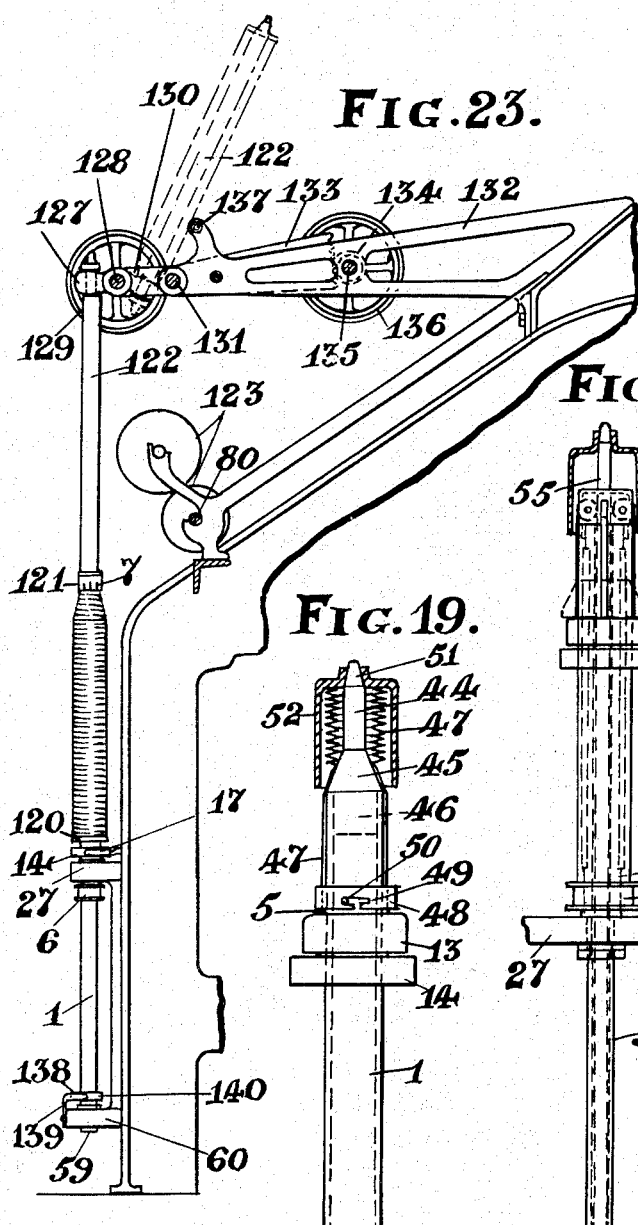
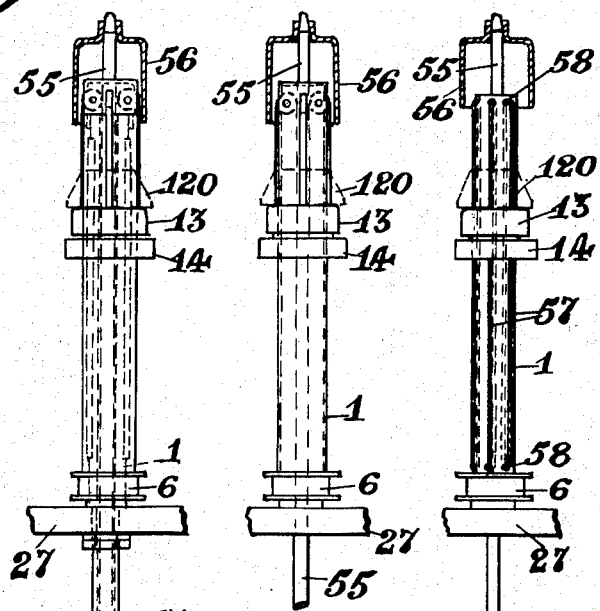
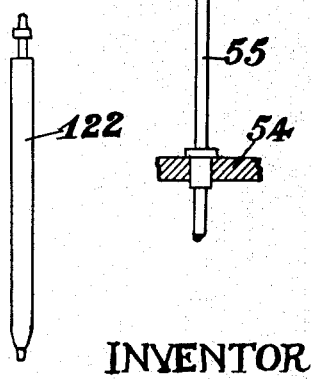

Patented June 9, 1936

2,043,607

UNITED STATES PATENT OFFICE 2,043,607

APPARATUS FOR USE IN THE DRAWING, SPINNING, AND TWISTING OF YARNS

Frank Dawes, Hipperholme, near Halifax, England

Application January 25, 1935, Serial No. 3,518
In Great Britain January 27, 1934

10 Claims. (Cl. 118—54)

This invention relates to apparatus for use in the drawing, spinning, twisting, and winding of yarns or other suitable materials hereinafter referred to as yarn, and has for its chief object to provide means whereby a substantially greater quantity of yarn can be produced for one doffing than can be obtained with any spinning, twisting or winding frame as at present constructed, with the result that considerably less doffings are required, the number of knots tied in the yarn are decreased, a smaller number of operatives are required to run a plant of a given size and the output is very considerably increased and costs greatly reduced in the processes concerned.

According to this invention a device is provided for use in connection with spindle mechanism to form a support for the yarn or other material during its winding thereupon, the surface or surfaces of the device being arranged to be presented around and/or along a spindle to give an increasing length of support as one end of the device is drawn along the spindle, in such a manner that the ultimate length of support presented is materially in excess of the length of support around the spindle at the commencement of winding. The yarn may be delivered to the device by means of a short up and down or reciprocating traverse motion and by the time that the support has completed its traverse along the spindle, a cop is formed which is much longer than the ordinary cop and may contain several times as much yarn as the latter.

The support may present one or more surfaces which are capable of being traversed along a revolving spindle which may be tubular, or solid and when arranged to present one surface only the support may take the form of a flexible tube that will be capable of occupying a more or less contracted, or collapsible condition and be drawn over or along a revolving spindle and thereby opened out into the form of a cylindrical, or other tube on which the yarn to be spun, or twisted can be wound. The construction may be such that as the surfaces are traversed over that portion of the spindle that is bounded by the short up and down or reciprocating traverse of the yarn, they occupy a more or less expanded position and as they pass below such portion they are capable of contracting so that the completely wound cop is quite free for the greater portion of its length and can be readily removed from the spindle and supporting surfaces for doffing purposes and during the time that it is being built it does not unduly interfere with the traverse of the supporting surfaces along the spindle.

Alternatively, the members that are adapted to be retained in an expanded position over that portion of the spindle that is more or less bounded by the short up and down or reciprocating traverse of the yarn may be separate from and independent of the traversing surfaces and be provided with means whereby they can be contracted, or withdrawn to facilitate the removal of the completely wound cop. The contraction of the expanding members may be effected independently on each spindle, or simultaneously on all the spindles. For doffing purposes a device is provided which may lower, connect with and hold vertically on to the spindle head a suitable retainer or mandrel for receiving the cop to be doffed, which retainer or mandrel when the cop has been doffed on to it may by suitable motions be swung away to clear all the working parts of the machine and be held in a convenient position for subsequent removal so as not to interfere with the re-commencing of the machine to build a new cop.

In the accompanying drawings:—

Fig. 2 is a view taken on line 2—2 of Fig. 1.

Fig. 3 is an end view looking in the direction of the arrow 3 in Fig. 1 showing the change speed gearing.

Fig. 4 is a view looking in the direction of the arrow 4 in Fig. 1 showing the ring rail lifting mechanism.

Fig. 5 is a view looking in the direction of the arrow 5 in Fig. 1, showing the cop building and removing mechanism.

Fig. 6 is an elevation of a form of spindle constructed in accordance with the invention.

Fig. 7 is a vertical section of the spindle shown in Fig. 6.

Fig. 8 is a vertical section of the lower part of the spindle shown in Fig. 7.

Fig. 9 is a section taken on line 9—9 of Fig. 7.

Fig. 10 is a section taken on line 10—10 of Fig. 7.

Figs. 11, 12 and 13 are elevations of modified forms of spindles constructed in accordance with the invention.

Fig. 14 is a section on line 14—14 of Fig. 13.

Fig. 15 is an elevation of a device for expanding the cords upon which the yarn is wound.

Fig. 16 is a vertical section of the upper end of a modified form of spindle.

Figs. 17 and 18 are vertical sections of the lower portion of a spindle fitted with a weight pulling down mechanism.

Fig. 19 is an elevation of a spindle fitted with an extensible and collapsible tube.

Figs. 20, 21 and 22 are elevations of modified forms of spindles for cap spinning frames.

Fig. 23 is an elevation showing mechanism for facilitating the removal of full cops from the spindles, and Fig. 24 is an elevation of a mandrel for accomodating a full cop during its removal from the spindles.

Figure 1:
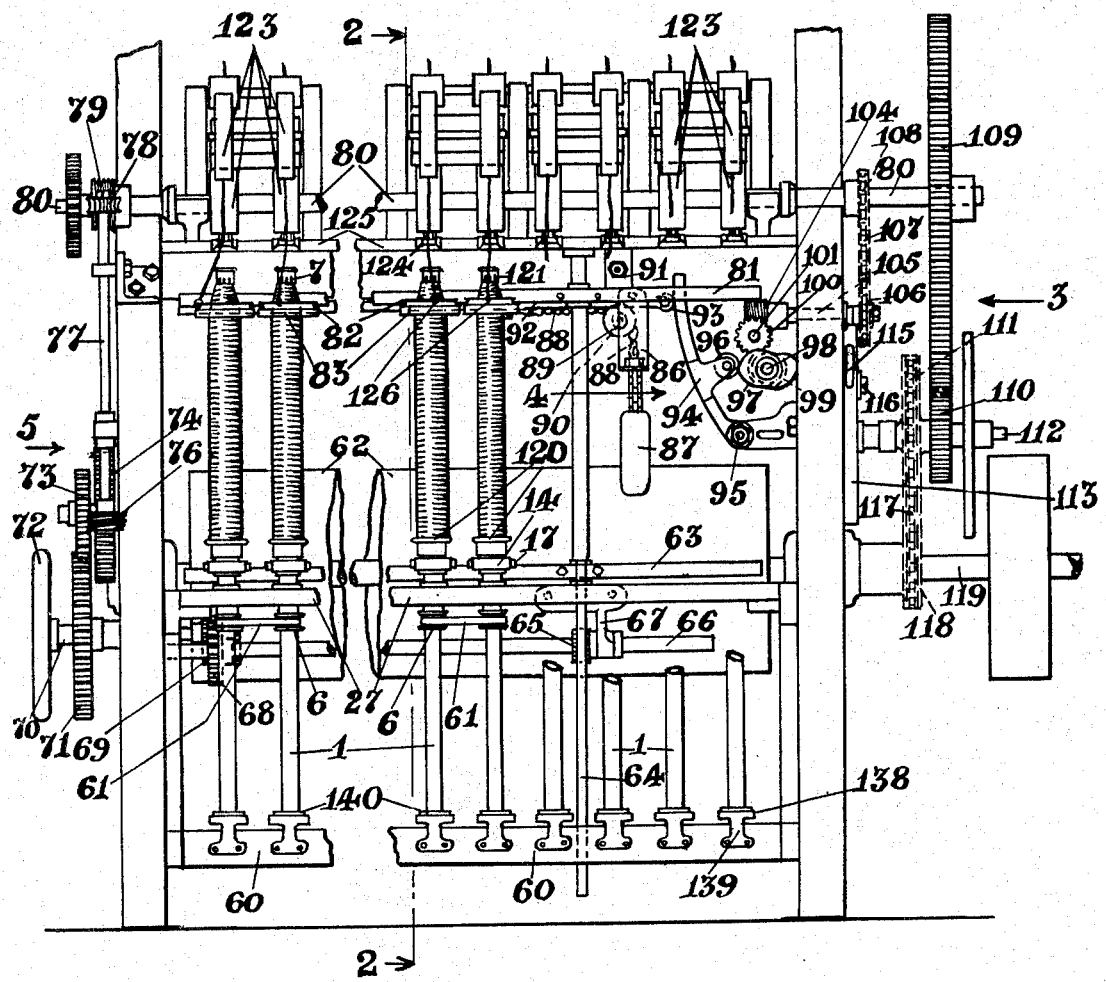
Fig. 1 is an elevation of a ring spinning and twisting frame provided with spindle apparatus constructed in accordance with this invention.

Referring to the construction shown in Figs. 6 to 10 each of the rotary spindles 1 comprises a tube that is formed with a number of grooves 2 and with a key-way 3 for a key 4 that projects internally from a sleeve 5 that is slidably mounted on the spindle 1 and on the lower end of the latter is a driving wharl 6. The grooves 2 are for the reception of cords 7 or the like which pass down the inside of the spindle 1 and are connected therein to a weight 8 and passed through holes in a flanged bush 9 that are adapted to register with slots 10 formed in the top of the spindle. After the cords have been passed through the holes in the flanged bush 9 the latter is inserted into an enlarged bore in the end of the spindle with its holes in line with the slots 10. The cords 7 are then taken down the grooves 2 and secured to a ring 11 that is fastened to the sleeve 5 by a screw 12 and is covered by a cap 13. Rotatably mounted on the sleeve 5 is a collar 14 that is fitted with a ball thrust bearing 15 and is kept in position on the sleeve by a retaining member 16 and is secured to a fork 17 hereinafter referred to. When the collar 14 is pulled down it takes the cords 7 with it thereby raising the weight 8. When the collar 14 is raised, the weight falls and pulls the cords in the reverse direction. The upper portion of the grooves 2 that are bounded by the short up and down traverse of the yarn may be comparatively shallow so that the portions of the cords which are travelling downwardly along the shallow portion of the grooves will project beyond the peripheral portion of the spindle and sink further into it as they pass below the portion bounded by the short up and down traverse of the yarn.

In the construction shown in Fig. 11 the spindle 1 in addition to being provided with the traversing cords 7 is formed with grooves 18 to receive a number of slidably mounted wires 19 which are fastened at the bottom to a grooved collar 20 that is slidably mounted on the spindle. The upper ends of the wires are reduced and made in the form of springs 21 which are approximately equal in length to the reciprocating traverse of the yarn, for the purpose previously described. The ends of the springs abut against the ends of the grooves or enter holes therein. Before commencing to wind the cop, the collar 20 is raised slightly and held in that condition by any suitable mechanism so that the springs become bowed as shown. Before removing the finished cop, the ring 20 is lowered to allow the springs to straighten and release the pressure that they exert on the bore of the cop. In this example a tension spring 22 is attached to the bottom of the spindle and to the weight 8 to supplement the action of the latter and enable a shorter weight to be used. If desired a spring only may be used. In the construction shown in Fig. 12 for providing the aforesaid expansion and contraction, ribs or bars 23 are slidably mounted in grooves 24 in the spindle. These grooves are inclined at 25 and the upper ends of the bars are chisel shaped as shown at 26, or rounded to facilitate their movement along the inclined portions 25 of the grooves 24. The bars 23 are continued through the spindle rail 27 and wharl 6 and attached to a grooved collar 28 which can be traversed to the bottom of the spindle when the full cop is to be withdrawn. In the construction shown in Figs. 13 to 15 a sleeve formed with vanes 29 shaped as shown in Figs. 14 and 15 is capable of receiving a slight turning movement on the spindle which is limited by a pin 30 on the spindle and slot 31 in the sleeve. This movement is utilized to expand the upper ends of the cords 7 as shown in Fig. 14 when winding and allow them to contract when doffing. In the construction shown in Fig. 16, spring ribbons 32 are substituted for the cords 7 and coiled at their upper ends round pins 33 to which they are attached. These pins are rotatably mounted in a cap 34 that is inserted in the end of the spindle.

The upper portions of the springs may be expanded by a sleeve 29 such as shown in Figs. 13 to 15 and the bottom ends of the springs may be attached to a collar 11 as shown in Fig. 7. In this construction when the collar is pulled down it uncoils the springs which automatically recoil after the manner of watch springs when the collar 11 is raised to doff the cop. In Fig. 17 the weight 8 is arranged to be pulled down by a ring 35 slidably mounted on the spindle. For this purpose an inner member 36 of a ball bearing is fitted with inwardly projecting pins 37 which pass through slots 38 in the spindle 1 and enter an annular groove 39 in the weight 8. The ring 35 can be actuated manually or mechanically for pulling the weight down. In Fig. 18 a cord 40 is attached to the weight by a swivel 41 fitted with a ball thrust bearing 42 and such cord is taken over a guide pulley 43 to a suitable position for enabling it to be actuated manually or mechanically to pull the weight down.

In Fig. 19 the spindle 1 is fitted at the top with a short spindle 44 of reduced diameter that is formed with a conical portion 45 and a plug 46 that fits in the top of the spindle 1. The reference character 47 indicates a flexible tube that can occupy a more or less collapsed condition and be opened out to its full diameter from one end to the other by drawing the lower end of the tube over the conical portion 45. For this purpose the bottom end of the tube is fitted with a ring 48 that is formed with a right and left hand bayonet slot 49 to engage a pin 50 projecting from the sleeve 5 which may be actuated in the manner shown in Fig. 7. The upper end of the flexible tube 47 may be fitted with a paper or other ring or disc formed with a small hole to fit the spindle 44 and the upper end of the latter may be tapered as shown at 51 to engage a corresponding hole in a cap 52 that fits on the tapered end 51 and in addition to serving as a cover for the flexible tube 47 helps the free movement of the yarn in its passage from the delivery rollers to the ring traveller. As the lower end of the tube 47 is drawn over the conical portion 45 on to the full diameter of the spindle 1, the portion of the tube so drawn over becomes transformed into a cylindrical tube on to which the yarn is wound during the spinning or twisting operation. The portion of the spindle below the part that is bounded by the short up and down traverse of the yarn may be reduced slightly in diameter or otherwise constructed to prevent the flexible tube from binding on the spindle.

In the example shown in Fig. 20 which shows one method of applying the invention to a cap spinning frame the tubular spindle 1 on which the yarn is wound is rotatably mounted on a stationary tube 53 which extends almost to the top of the spindle 1, passes through the spindle rail 27 to which it is clamped or otherwise fixed and is continued to the foot step rail 54. Passing through the stationary tube 53 is the cap spindle 55 which is lifted and lowered during the building of the cop and is fitted at the top with the cap 56 which in addition to acting in its ordinary capacity for cap spinning also acts as a cover for the upper part of the yarn supporting members.

In the construction shown in Fig. 21 the stationary tube 53 is dispensed with and the spindle 1 is mounted directly on the cap spindle 55, suitable bearing surfaces being interposed between the latter and the spindle 1 for guiding and steadying purposes.

In the construction shown in Fig. 22 the members or supports for the yarn take the form of endless cords 57 which pass through holes 58 at the top and near the bottom of the spindle 1, and are attached to a slidable member 13 which may be actuated by a collar 14 as described with reference to Fig. 7. The endless cords 57 can be substituted for the weighted cords 7 shown in the various examples of ring spinning spindles, and they can be applied to spindle apparatus for ring spinning, cap spinning, drawing and winding frames.

In the construction shown in Figs. 1 to 5 for applying the invention to a ring spinning frame a number of spindles such for example as those shown in Figs. 6 to 10 are rotatably mounted in a fixed rail 27 and supported at their bottom ends in foot step bearings 59 (Fig. 8) in a foot step rail 60. The spindles so mounted may be driven in any suitable manner, for example by tapes or bands 61 passing over wharl 6 and over the usual tin cylinder 62. Each of the forks 17 previously referred to is fixed on a dropping bar 63 that occupies a top position at the commencement of the spinning operation and is gradually lowered to draw with it the cords 7 or the like. This is conveniently effected by a series of racks such as 64, any number of which can be employed according to the length of the machine. Each of these racks is fixed to the bar 63 and gears with a pinion 65 on a shaft 66 that is carried in bearings in brackets such as 67 fixed to the spindle rail 27. The shaft 66 is fitted at one end with a wheel 68 that gears with a wide wheel 69 rigidly fixed on an endwise movable shaft 70 which extends through the end frame of the machine and has rigidly fixed on it a toothed wheel 71 and a hand wheel 72. The wheel 71 gears with a change wheel 73 that rotates with another change wheel 74, both of which are mounted on a slotted bracket 75 that can be fixed to the frame in various adjusted positions. The wheel 74 gears with a worm 76 on a shaft 77 that is fitted at its upper end with a worm wheel 78 that gears with a worm 79 that is fixed on the front roller shaft 80. By altering the change gearing 73 and 74 the dropping bar 63 can be lowered at any predetermined speed to suit the number of counts. Any suitable lifter motion may be employed for lifting and lowering the ring rail 81 for completing the cop. In the construction shown in Fig. 2 each of the rings 82 is secured to the ring rail by a clip 83, the ends of which are passed through slots formed in an inverted U clip 84 that is fixed in position on the ring rail by a screw 85. Fixed to the rail 81 at suitable distances apart are a series of angle brackets such as 86, each of which is fitted with a weight 87 and is attached by a chain 88 that passes over a roller 89 that is free to run on a stud or axle 90 carried by a bracket 91 that is attached to the machine framework. The chain 88 after passing over the roller 89 is attached to a slidably mounted bar 92 fitted with a roller 93 that bears against a lever or arm 94 pivoted at 95 and provided with a bowl 96 that is maintained in contact with a double heart shaped cam 97. The latter is fixed on a short shaft 98 that is mounted in a suitable bearing and carries a toothed wheel 99. This wheel gears with a toothed wheel 100 fixed on one end of a shaft 101 that is rotatably mounted in a bracket 102 (Fig. 4). Fixed on the other end of such shaft is a worm wheel 103 that gears with a worm 104 fixed on a shaft 105 that is rotatably mounted in bearings on the machine frame and is fitted outside the latter with a sprocket wheel 106 that is connected by a chain 107 with a sprocket wheel 108 fixed on the shaft 80. The shaft 80 is driven by a toothed wheel 109 from a change wheel 110 that is rotatable with a sprocket wheel 111, both of which are mounted on a stud 112 carried by a slotted bracket 113 that is pivoted at 114 and can be moved to any adjusted position by a handle 115 and secured by a nut 116. The sprocket wheel 111 is connected by a chain 117 with a sprocket wheel 118 that is fixed on the main driving shaft 119. The double heart shaped cam 99 is made of any suitable size according to the desired lift, or traverse of the ring rail. Before commencing the formation of a cop, the drop rail 63 is occupying its top position and a building cone such as 120 shown particularly in Figs. 6 and 7 is slid over each of the spindles until it rests on the cap 13. A slotted ferrule 121 also shown particularly in Figs. 6 and 7 is placed on the top of each spindle and acts as a guide for commencing the building of the cop and for a doffing mandrel 122 (Figs. 23 and 24). Before the commencement of the spinning operation the yarn is led down through the drawing rollers 123, Figs. 1 and 2, eyes 124 of the wire board 125, ring travellers 126, and fastened to the building cone 120. The hand wheel 72 is now pushed in to engage the wheel 71 with the wheel 73 and the machine set in motion for spinning. During the drawing, or spinning operation the traversing yarn supports are gradually drawn down the outside of the spindle 1 and the ring rail 81 is receiving a short up and down traverse by the cam 97 and weights 87, with the result that a cop is gradually being formed on the spindle and by the time that the traversing yarn supports have completed their downward traverse along the outside of the spindle, the cop is completed. The short traverse of the ring rail 81 is arranged to take place at the top or upper part of the spindle consequently ballooning is reduced to a minimum, and when the cop is completely formed it is of a greater length than the balloon that is formed in the yarn between the eye 124 of the wire board 125 and the ring traveller 126 and in the case of cap spinning, from the eye of the wire board to the lower edge of the cap 56. In all existing systems the length of the balloon is greater than the length of the finished cop. In addition to this feature the drag from the delivery rollers to the ring traveller is considerably lessened and made more uniform owing to the short amount of traverse that is necessary. By this means finer counts can be spun and larger rings used than is at present possible. Heavier travellers may be employed with beneficial results in the way of getting tighter winding and more yarn on the cop.

To facilitate the removal of the full cops from the spindles, a mandrel 122, Fig. 23 is tapered at one end to enter the top of the spindle and the other end of the mandrel is formed with a neck as shown in Fig. 24 which is pushed into a spring clip 127. Each of these clips is secured to a shaft 128 that is fitted with a hand wheel 129. The shaft 128 is mounted in a series of arms 130 that are fixed on another shaft 131 that is free to turn in brackets 132 fixed to the machine frame. The shaft 131 may be fitted with toothed sectors 133 to engage pinions 134 on a shaft 135 that is mounted in the bracket 132 and is fitted with a hand wheel 136.

To doff the cops, the machine is stopped, the mandrels 122, Fig. 23 which has previously been placed in the clips 127 and occupy the upper position shown in Fig. 23 are turned over by the hand wheel 129 and their lower ends engage in the bushes 9 in the tops of the spindles. The handwheel 72, Fig. 1 is pulled outwards thereby imparting an endwise movement to the shaft 70 and disengaging the toothed wheel 71 from the change wheel 73. The handwheel 72 is now turned and through the wide wheel 69, Figs. 1 and 5 turns the wheel 68 and the shaft 66 and pinion 65, Fig. 2 to raise the racks 64 which are fixed to the bar 63 and to which are secured the clips 17 that are attached to the caps 13. This movement pushes the cop along the mandrel and when completed the handwheel 136, Fig. 23 is given a slight turn to raise the bottom ends of the mandrels 122 clear of the tops of the spindles. The handwheel 129 is then turned to turn the full cops over until they are arrested by the bar 137 as shown by the dotted lines in Fig. 23. The machine can then be put into operation for winding fresh cops and during this operation the full cops can be removed from the clips 127. Each of the spindles is provided at the bottom end with a foot actuated brake 138, Fig. 2 which may comprise a U shaped clip lined with brake material and attached to the bottom rail 58 by a spring arm 139 which normally holds the clip out of contact with a collar 140 on the spindle. If desired the cop or yarn can be wound on a paper or other tube to form an internal support for the cop when the latter is removed.

The invention described can be applied to operations commencing with the two spindle gill box and every subsequent operation up to and including twisting, with the exception of single and two-fold weft which is spun directly on to a spool of a given size, or yarn may be spun on the principle herein described and subsequently rewound on to a spool of any appropirate size.

What I claim as my invention and desire to secure by Letters Patent in the United States is:—

1. In a device of the class described the combination with a rotary spindle of an extensible yarn support and means for extending the length of said yarn support along the spindle for gradually lengthening the surface on which the yarn is to be wound.

2. In a device of the class described, the combination with a rotary spindle of a flexible yarn support and means for gradually extending the length of the yarn support along the spindle from the top to any predetermined distance from the bottom according to the length of cop to be produced.

3. In a device of the class described, the combination with a rotary tubular spindle having guiding surfaces formed thereon near the top thereof of a yarn support comprising a number of flexible members carried by said spindle and partly within the same, means for drawing said members from within the spindle over said guiding surfaces and down over the exterior of the spindle for gradually lengthening the surface on which the yarn is to be wound, and means for restoring the flexible members to their original position.

4. In a device of the class described, the combination with a rotary spindle of an extensible yarn support, means for extending the length of said yarn support along the spindle for gradually lengthening the surface on which the yarn is to be wound, and means for delivering the yarn to the support by means of a short reciprocatory traverse motion.

5. The structure of claim 3 and a slotted ferrule on the top of each spindle to provide a surface of increased diameter on which to commence the building of the cop and also to come away from the cop and facilitate its removal when doffing.

6. The structure of claim 3, said last named means comprising means for exerting a downward pull on the inner ends of the flexible members, said first named means comprising a collar slidably mounted on the spindle and connected with the outer ends of said flexible members, and means for gradually moving the collar down the spindle to increase the length of the flexible members along the outer surface of the spindle.

7. In a device of the class described, the combination with a rotary tubular spindle having guiding surfaces formed thereon near the top thereof, of a yarn support comprising a number of flexible members carried by said spindle and partly within the same, means for drawing said members from within the spindle over said guiding surfaces and down over the exterior of the spindle for gradually lengthening the surface on which the yarn is to be wound, means for restoring the flexible members to their original position, and means for causing the bore of the cop to be made slightly larger in diameter than the diameter of the spindle to facilitate doffing.

8. The structure of claim 7, a detachable doffing mandrel mounted adjacent said spindle in a normally inoperative position in relation to the same, means for moving the mandrel from that position into line with the spindle and into operative connection with the top end thereof, means for transferring the wound cop from the spindle to the mandrel, and means for returning the doffing mandrel to its inoperative position.

9. The structure of claim 1 and means for freeing the fully wound cop preparatory to doffing.

10. The structure of claim 4 and means on that portion of the spindle that is bounded by the short reciprocating traverse of the yarn for making the bore of the cop larger than the diameter of the spindle so that the completely wound cop is quite free for the greater portion of its length to facilitate the doffing operation.

FRANK DAWES.